(12) United States Patent
Basu et al.

(10) Patent No.: US 11,161,476 B2
(45) Date of Patent: Nov. 2, 2021

(54) AUTOMATIC DISABLING OF AUTONOMOUS VEHICLES SYSTEMS

(71) Applicants: Rajat Basu, San Francisco, CA (US); Chase Kaufman, Fountain Hills, AZ (US); Jeffrey Brandon, Phoenix, AZ (US)

(72) Inventors: Rajat Basu, San Francisco, CA (US); Chase Kaufman, Fountain Hills, AZ (US); Jeffrey Brandon, Phoenix, AZ (US)

(73) Assignee: GM Cruise Holdings, LLC, San Francisco, CA (US)

( * ) Notice: Subject to any disclaimer, the term of this patent is extended or adjusted under 35 U.S.C. 154(b) by 0 days.

(21) Appl. No.: 16/822,150

(22) Filed: Mar. 18, 2020

(65) Prior Publication Data
US 2021/0291785 A1    Sep. 23, 2021

(51) Int. Cl.
*B60R 25/20*    (2013.01)
*B60R 25/40*    (2013.01)

(52) U.S. Cl.
CPC .......... *B60R 25/2018* (2013.01); *B60R 25/40* (2013.01)

(58) Field of Classification Search
CPC ... B60R 25/2018; B60R 25/04; B60R 25/102; B60R 25/24; B60R 25/241; B60R 25/245; B60R 25/246; B60R 25/40; E05B 77/44; G07B 15/00; G07C 9/00309; G07C 9/00571; G07C 9/00896

USPC .................................................... 340/426.13
See application file for complete search history.

(56) References Cited

U.S. PATENT DOCUMENTS

| | | | | |
|---|---|---|---|---|
| 6,670,883 B1* | 12/2003 | Asakura | ................... | B60R 25/24 307/10.1 |
| 8,022,573 B2* | 9/2011 | Powers | .................. | G08B 13/06 307/66 |
| 9,387,771 B1* | 7/2016 | Shekher | ................... | B60L 53/16 |
| 2013/0131911 A1* | 5/2013 | Smith | ................ | B60H 1/00985 701/29.1 |
| 2014/0316612 A1* | 10/2014 | Banter | ..................... | E05B 81/56 701/2 |
| 2015/0343993 A1* | 12/2015 | Ferrieres | ................. | B60R 25/04 701/2 |
| 2016/0075210 A1* | 3/2016 | Quaranta-Guido | ......................... | B60H 1/00985 701/48 |
| 2016/0110938 A1* | 4/2016 | Kleve | .................... | A45C 11/00 340/5.61 |
| 2020/0101306 A1* | 4/2020 | Roberto | ............. | A61N 1/36135 |
| 2020/0132034 A1* | 4/2020 | Ando | ...................... | B60R 25/01 |
| 2021/0094438 A1* | 4/2021 | Ciccone | ................ | F02D 41/062 |

* cited by examiner

*Primary Examiner* — Stephen R Burgdorf
(74) *Attorney, Agent, or Firm* — Polsinelli, PC

(57) ABSTRACT

The subject disclosure relates to techniques for enabling secured access to vehicles. A process of the disclosed technology can include steps for determining, via at least one system status monitor, that at least one vehicle system of a vehicle is in a suboptimal operating condition, determining that the at least one vehicle system with the suboptimal operating condition is in control of at least one other vehicle system, and disabling automatically the at least one other vehicle system.

9 Claims, 4 Drawing Sheets

AUTOMATIC DISABLING OF AUTONOMOUS VEHICLES SYSTEMS

TECHNICAL FIELD

The subject technology provides solutions for providing secured access to vehicles and in particular, monitoring vehicle system health and preemptively disabling vehicle systems.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

When a vehicle is deployed for use, the vehicle may encounter system failures or situations warranting stopping the vehicle. Human drivers use their judgment to determine when to stop a vehicle and are able to grant or deny access to the vehicle based on their judgment. Furthermore, typical vehicles have mechanical locks to additionally provide access to personnel with corresponding keys. However, vehicles may not always have a human driver therein to grant or deny access at the time of system failures or stopped vehicles. Similarly, mechanical locks and/or corresponding keys may not always be readily available.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Traditionally, vehicles have mechanical locking mechanisms with a locking cylinder and a respective key. This disclosure contemplates removing mechanical locking systems and using only electrical locking mechanisms to reduce redundancies and to generate elegant solutions for future vehicles without mechanical locking systems.

When mechanical locking systems are removed from vehicles, many problems may arise. For example, when a vehicle is deployed for use, the vehicle may encounter system failures or situations warranting stopping the vehicle. When this happens, technicians and other personnel are unable to access the interior of the vehicle.

This problem is further compounded when the vehicle is an autonomous vehicle. More specifically, human drivers can use their judgment to determine when to stop a vehicle and are able to grant or deny access to the vehicle based on their judgment prior to the vehicle systems becoming inoperable. However, it is challenging for an autonomous vehicle to determine when to grant or deny access prior to the vehicle systems becoming inoperable and impossible after the vehicle systems are inoperable.

Furthermore, autonomous vehicles may also generally be in communication with a remote server that communicates commands to the autonomous vehicles to determine access. Thus, when communication between the autonomous vehicles and the remote servers is unavailable, these problems are further exacerbated.

Accordingly, the disclosed technology addresses the need in the art for a local, electrical system capable of controlling access to the vehicle without communication with a remote server and without mechanical redundancies.

Figure 1:
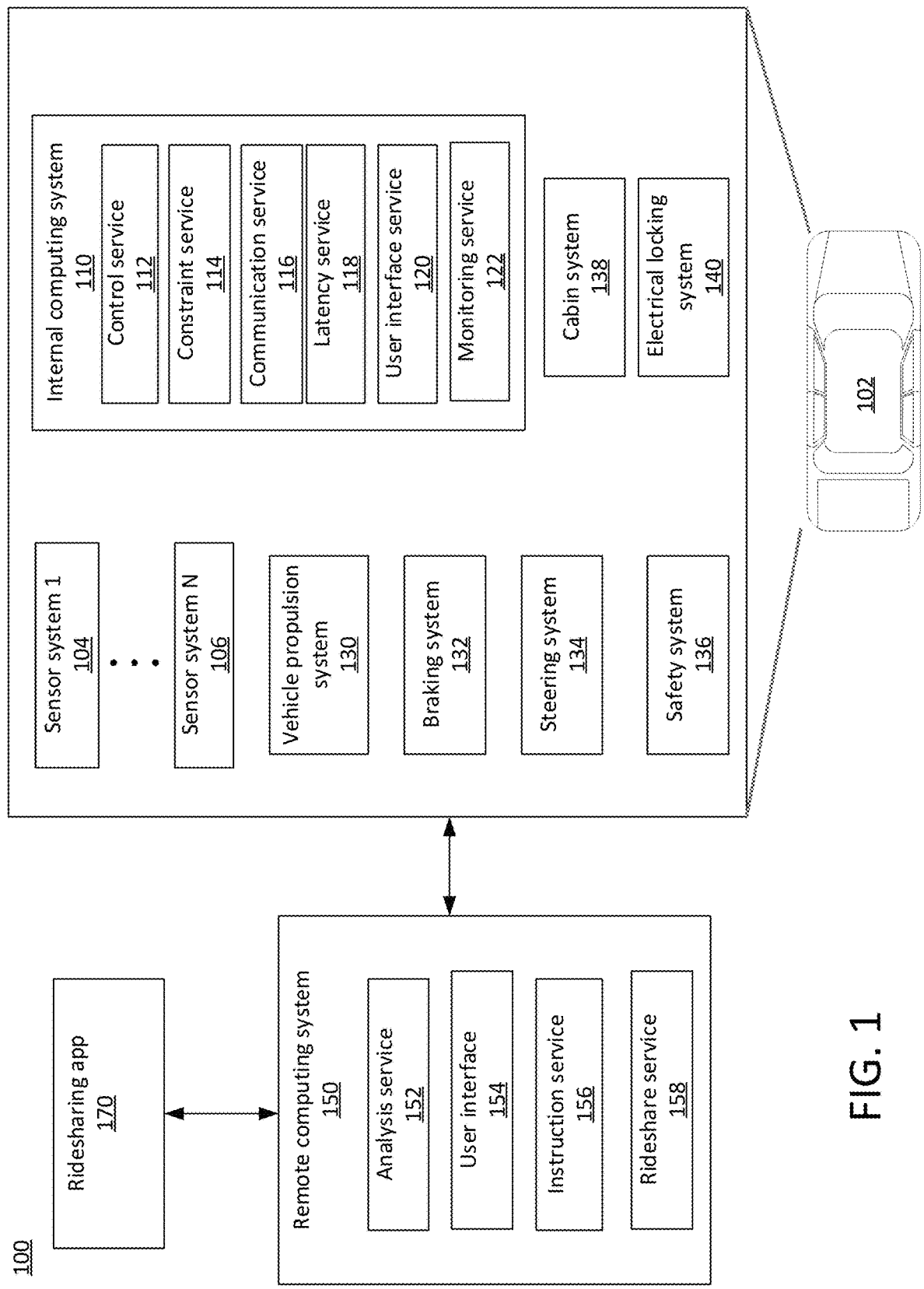
FIG. 1 shows an example system for operating a vehicle in accordance with some aspects of the present technology.

FIG. 1 illustrates environment 100 that includes a vehicle 102 in communication with a remote computing system 150. In some instances, the vehicle 102 may be an autonomous vehicle 102.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor with a battery, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 further includes an electrical system 140 that includes and communicates with electrical locks disposed on doors of the autonomous vehicle 102. The electrical system is further in communication with the internal computing system 110 to receive commands and send a status of the electrical locks (e.g. the locks are engaged, doors are locked, access is denied to the cabin). The electrical locks are capable of locking and unlocking doors of the autonomous vehicle 102 to deny and grant access to a cabin of the autonomous vehicle 102.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

The internal computing system 110 can also include a monitoring service 122 that can monitor system health of the systems on the autonomous vehicle 102. The monitoring service 122 can include both software and hardware elements for monitoring and determining the health of various systems. For example, the monitoring service 122 may include sensors on a battery of the autonomous vehicle 102 that monitors and determines a current battery charge of the battery.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
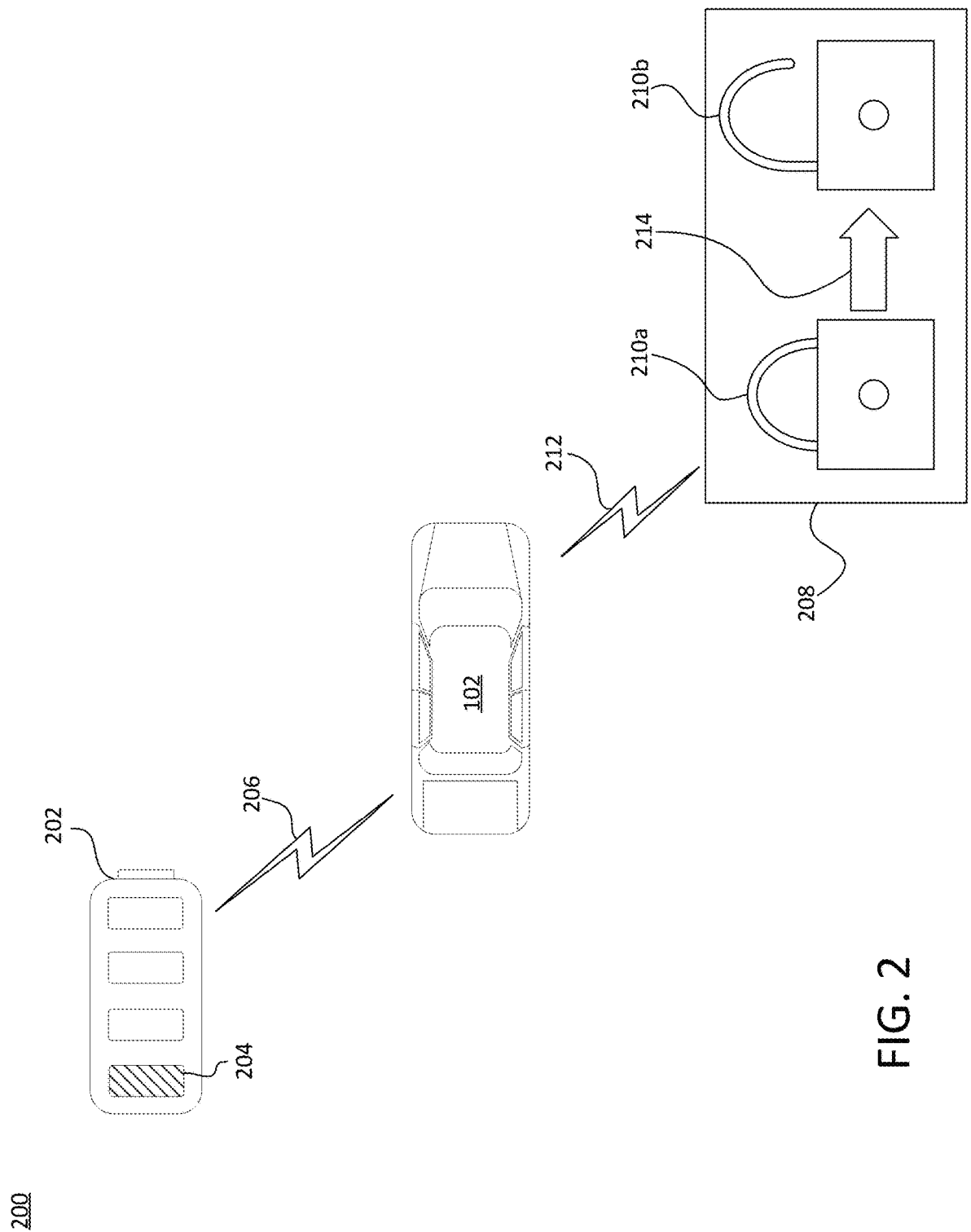
FIG. 2 shows an example environment in which the vehicle determines to provide access to the cabin of the vehicle.

FIG. 2 shows an example environment 200, in which the vehicle 102 monitors a first vehicle system 202. More specifically, the internal computing system 110 of the vehicle 102 monitors, via monitoring service 122, the first vehicle system 202. In this example environment 200, the first vehicle system 202 is a battery. In some embodiments, the first vehicle system 202 includes, but is not limited to, various services, sensors, and/or other systems on-board the vehicle 102, including, but not limited to the sensor systems 104-106, braking system 132, steering system 134, safety system 136, communication service 116, user interface service 120, etc.

The first vehicle system 202 has a first vehicle system status 204. In other words, the battery has a battery status, indicating the charge remaining in the battery. In some embodiments, the first vehicle system status 204 includes, but is not limited to, sensor image quality, detected distance for stopping distances, degree or ability to turn the vehicle 102, etc.

The vehicle 102 has detected 206 that the battery status has a low remaining charge. More specifically, the internal computing system 110 of the vehicle 102 has detected 206, via the monitoring service 122, that the first vehicle system status 204 of the first vehicle system 202 is in a suboptimal condition. Similarly, in other embodiments, the vehicle 102 may detect 206 that stopping distances have increased, ability to turn has decreased, etc.

The internal computing system 110 of the vehicle 102 then responds by sending a command 212 that disables 214 a second vehicle system 208. The second vehicle system 208 here is an electronic locking system having a second vehicle system status 210. The second vehicle system status 210 is initially an enabled and/or locked status 210a. Thus, the vehicle 102 responds by sending the command 212 to change or disable 214 the second vehicle system status 210 to a disabled and/or unlocked status 210b. In other words, the vehicle 102 detects that the battery 202 has a low battery charge 204 and, while the battery 202 still has charge, sends the command 212 automatically disabling 214 the electronic locks 208 of the vehicle 102 so that personnel can access the vehicle 102 even after the battery 202 of the vehicle 102 runs out of charge. It is to be understood, however, that the second vehicle system 208 may be any other system of the vehicle 102 including, but not limited to, the vehicle propulsion system 130, the braking system 132, the steering system 134, the safety system 136, etc.

For example, the internal computing system 110 may detect, via the monitoring service 122, that the communication service 116 is experiencing degrading cellular network communication. Thus, the internal computing system 110 may, while still having network connection, receive remaining waypoints to finish a current journey or route.

As another example, the internal computing system 110 may detect, via the monitoring service 122, that the cabin system 138 is experiencing failures, such as failure to circulate air or filter air. Thus, the internal computing system 110 may control windows of the vehicle 102 to roll down to allow fresh air to circulate into the vehicle 102. Similarly, the internal computing system 110 may detect an electrical fire and accordingly control the windows to roll down.

As another example, the internal computing system 110 may determine that the internal computing system 110 itself is not responding optimally (e.g. responding slowly). The internal computing system 110 may then cause the electrical locking system 140 to unlock the doors of the vehicle 102.

It is further contemplated that when the battery of the vehicle 102 is determined to have a low charge, the internal computing system 110 may shut down various systems to sustain power to critical vehicle systems. For example, the internal computing system 110 may shut down the electrical locking system 140 to maintain power to the vehicle propulsion system 130.

Figure 3:
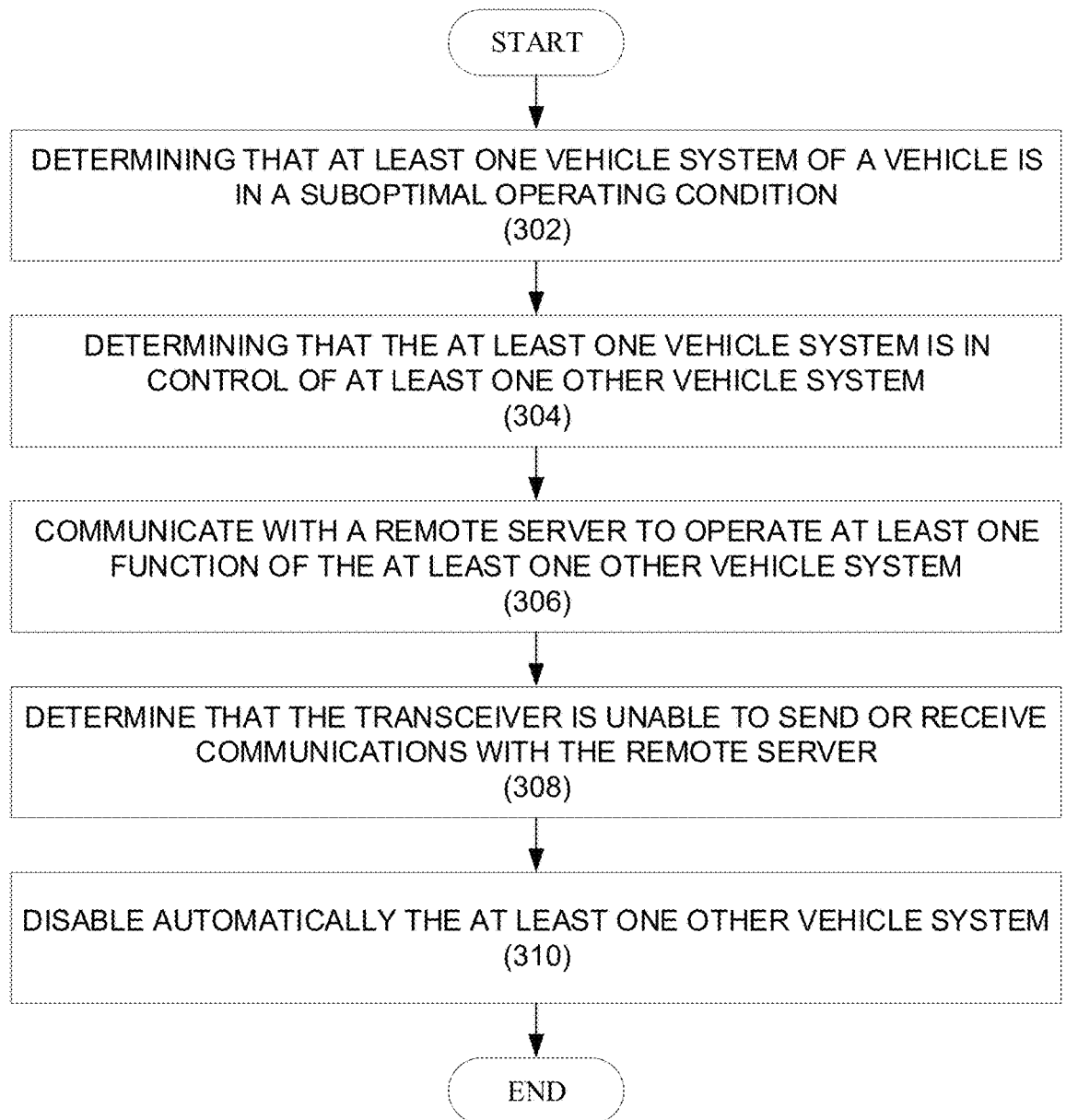
FIG. 3 shows an example method for providing access to the vehicle in accordance with some aspects of the present technology.

FIG. 3 shows an example method 300 for providing secured access to vehicles 102. In some embodiments, the vehicles 102 have electronic locks without mechanical backups or mechanical locks. The method 300 begins with the internal computing system 110 determining 302 that at least one vehicle system of a vehicle is in a suboptimal operating condition. As with the example discussed above in FIG. 2, the internal computing system 110 determines 302 that the battery (e.g. at least one vehicle system) has a low charge (e.g. a suboptimal operating condition). In other words, the at least one vehicle system is a battery and the suboptimal condition indicates that the battery has a low charge or that the battery charge is below a threshold charge or value. In some embodiments, the internal computing system 110 may determine 302 this information by utilizing and communicating with a separate system status monitor, which monitors and communicates with the at least one vehicle system. In some embodiments, the internal computing system 110 may directly monitor and communicate with the at least one vehicle system.

The internal computing system 110 then determines 304 that the at least one vehicle system is in control of at least one other vehicle system. Again referring to the above example, the internal computing system 110 determines 304 that the battery (i.e. at least one vehicle system) is in control of the electronic locking system (i.e. at least one other vehicle system). In determining whether the at least one vehicle system is in control of the at least one other vehicle system, the internal computing system 110 may consider factors including, but not limited to, communication between the systems, the reliance or requirement of one system on another, specific commands to and from one system to another, etc. In the example above, the internal computing system 110 determines 304 that the electronic locking system requires energy from the battery; thus the internal computing system 110 determines 304 that the battery controls the electronic locking system.

In some embodiments, the internal computing system 110 can communicate 306 with a remote server or remote computing system 150 to operate at least one function of the at least one other vehicle system. More specifically, the internal computing system 110 may utilize a transceiver on the vehicle 102 to communicate with the remote computing system 150. Continuing the example above, the internal computing system 110 attempts to communicate 306 with the remote computing system 150. If communication 306 is successful, the remote computing system 150 may send a command to the internal computing system 110 to disable and/or unlock (i.e. at least one function) the electrical locking system. Accordingly, the internal computing system 110 may receive the command via the transceiver from the remote computing system 150 to operate the at least one function of the at least one other vehicle system. In some embodiments, the command from the remote computing system 150 may be operable when the at least one vehicle system is in an acceptable operating condition. In other words, the command may unlock the electrical locking system when there is enough battery charge remaining.

If the internal computing system 110 attempts to communicate 306 with the remote computing system 150, the internal computing system 110 may then determine 308 that the transceiver is unable to send or receive communications with the remote computing system 150 or the remote server. The internal computing system 110 may determine 308 this using a variety of different factors including, but not limited to time between sending and receiving communications, error messages, etc.

The internal computing system 110 then disables 310 automatically the at least one other vehicle system. Continuing the above example, the internal computing system 110 unlocks or disables 310 automatically the electrical locking system of the vehicle 102. In some embodiments, the internal computing system 110 may send a system command to another system that controls the at least one other vehicle system. For example, the internal computing system 110 may send the system command to a vehicle control system that communicates with the electrical locking system. The system command may be effective to cause that at least one other vehicle system (i.e. the vehicle control system) to unlock electronic locks disposed on the vehicle. In other words, the vehicle control system may then actuate the unlocking or disabling 310 of the electrical locking system. In some embodiments, the at least one other vehicle system is disabled while the battery still has power.

Figure 4:
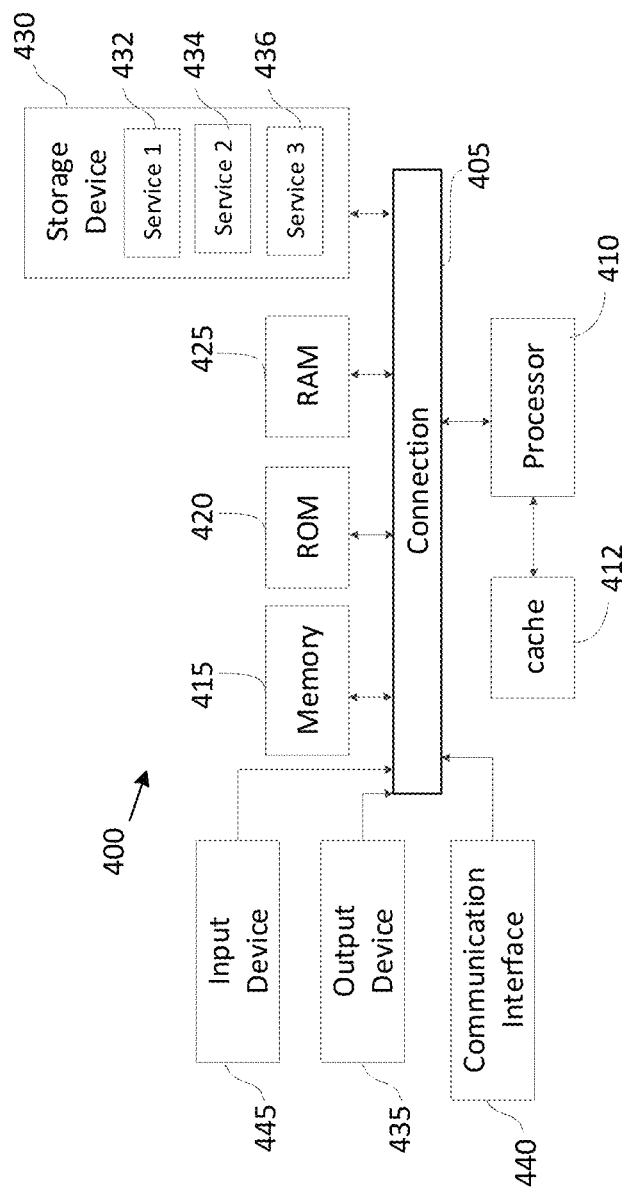
FIG. 4 shows an example of a system for implementing certain aspects of the present technology.

FIG. 4 shows an example of computing system 400, which can be for example any computing device making up internal computing system 110, remote computing system 150, (potential) passenger device executing rideshare app 170, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
  receiving a command, via a transceiver of an autonomous vehicle, from a remote server to operate at least one function of at least one vehicle system of the autonomous vehicle, wherein the at least one vehicle system comprises electronic locks without a mechanical backup, wherein the command from the remote server is operable when at least one other vehicle system of the autonomous vehicle is in an acceptable operating condition;
  determining, via at least one system status monitor of the autonomous vehicle, that the at least one other vehicle system is in a suboptimal operating condition;
  determining that the at least one other vehicle system with the suboptimal operating condition is in control of the at least one vehicle system;
  determining that the transceiver is unable to communicate with the remote server; and
  disabling automatically the at least one vehicle system based upon the determined suboptimal condition of the at least one other vehicle system or if the determined transceiver is unable to communicate with the remote server, wherein disabling the at least one vehicle system comprises unlocking the electronic locks.

2. The method of claim 1, wherein the at least one other vehicle system is a battery, and the suboptimal condition indicates a low charge, wherein the autonomous vehicle unlocks the electronic locks while the battery still has power.

3. The method of claim 1, wherein the disabling of the at least one vehicle system comprises sending a command to the at least one vehicle system, the command effective to cause the at least one vehicle system to unlock the electronic locks disposed on the autonomous vehicle.

4. An autonomous vehicle comprising:
  a transceiver for communicating with a remote server, the transceiver is configured to receive a command from the remote server to operate at least one function of at least one vehicle system of the autonomous vehicle, wherein the at least one vehicle system comprises electronic locks without a mechanical backup, wherein the command from the remote server is operable when at least one other vehicle system of the autonomous vehicle is in an acceptable operating condition;
  at least one system status monitor, wherein the system status monitor is configured to determine that at least one other vehicle system is in a suboptimal operating condition;
  at least one processor in communications with the at least one system status monitor, the transceiver, and the remote server;
  a non-transitory computer readable medium storing instructions, the instructions are effective to cause the at least one processor to:
    determine, via at least one system status monitor, that the at least one other vehicle system is in a suboptimal operating condition;
    determine that the at least one other vehicle system with the suboptimal operating condition is in control of the at least one vehicle system;
    determine that the transceiver is unable to communicate with the remote server; and
    automatically disable the at least one vehicle system based upon the determined suboptimal condition of the at least one other vehicle system or if the determined transceiver is unable to communicate with the remote server, wherein disabling the at least one vehicle system comprises unlocking the electronic locks.

5. The vehicle of claim 4, wherein the at least one other vehicle system is a battery, and the suboptimal condition indicates a low charge, wherein the autonomous vehicle unlocks the electronic locks while the battery still has power.

6. The vehicle of claim 4, wherein the at least one other vehicle system is a battery, and the suboptimal condition is a battery charge below a threshold charge, wherein the autonomous vehicle unlocks the electronic locks while the battery still has power.

7. The vehicle of claim 4, wherein the automatic disabling of the at least one vehicle system comprises sending a command to the at least one vehicle system, the command effective to cause the at least one vehicle system to unlock electronic locks disposed on the autonomous vehicle.

8. A non-transitory computer-readable medium storing instructions thereon, the instructions are effective to cause at least one processor to:
receive a command, via a transceiver, from a remote server to operate at least one function of at least one vehicle system of an autonomous vehicle, wherein the at least one vehicle system comprises electronic locks without a mechanical backup, wherein the command from the remote server is operable when at least one other vehicle system of the autonomous vehicle is in an acceptable operating condition;
determine, via at least one system status monitor, that the at least one other vehicle system is in a suboptimal operating condition;
determine that the at least one other vehicle system with the suboptimal operating condition is in control of the at least one vehicle system;
determine that the transceiver is unable to communicate with the remote server; and
disable automatically the at least one vehicle system based upon the determined suboptimal condition of the at least one other vehicle system or if the determined transceiver is unable to communicate with the remote server, wherein disabling the at least one vehicle system comprises unlocking the electronic locks.

9. The non-transitory computer-readable medium of claim 8, wherein the at least one other vehicle system is a battery, and the suboptimal condition indicates a low charge, wherein the autonomous vehicle unlocks the electronic locks while the battery still has power.

* * * * *